Dec. 4, 1928. 1,694,362

G. D. SUNDSTRAND

ADDING AND LISTING MACHINE

Filed Sept. 28, 1922 12 Sheets-Sheet 4

INVENTOR
G.D. Sundstrand
By Chindahl, Parker & Carlson
Attys

Dec. 4, 1928.  1,694,362
G. D. SUNDSTRAND
ADDING AND LISTING MACHINE
Filed Sept. 28, 1922   12 Sheets-Sheet 6
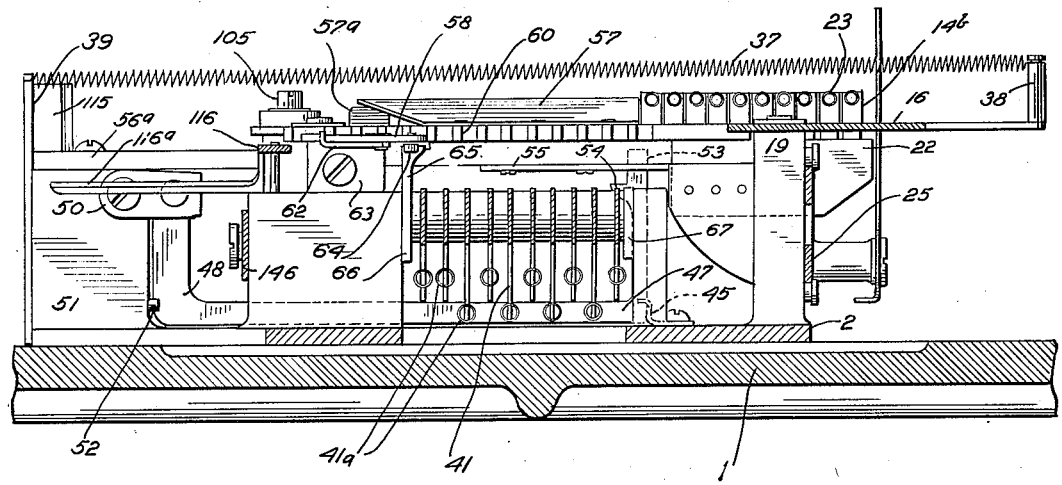
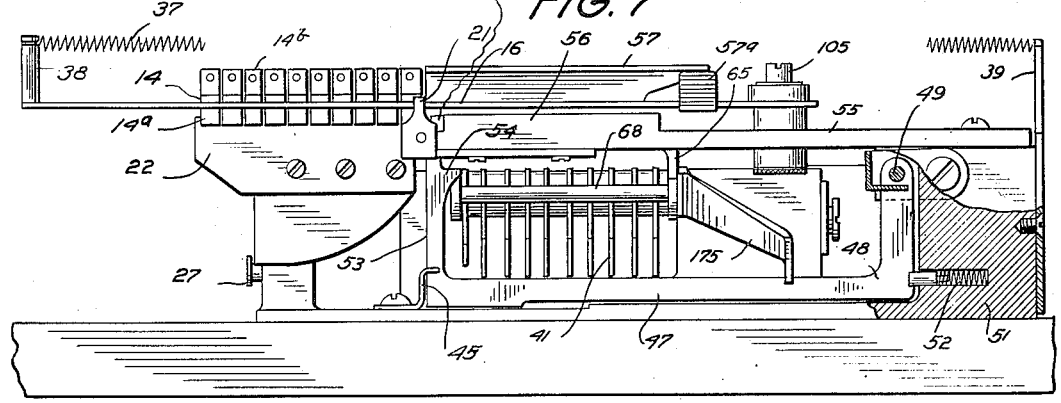
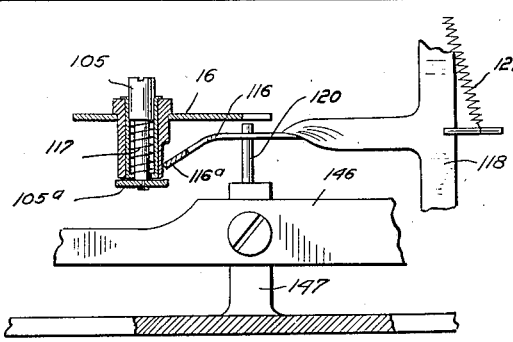
INVENTOR
G. D. Sundstrand
By Chindahl, Parker & Carlson
Attys Dec. 4, 1928.                                                           1,694,362
G. D. SUNDSTRAND
ADDING AND LISTING MACHINE
Filed Sept. 28, 1922         12 Sheets-Sheet 7

INVENTOR
G. D. Sundstrand
By Chindahl, Parker & Carlson
Attys

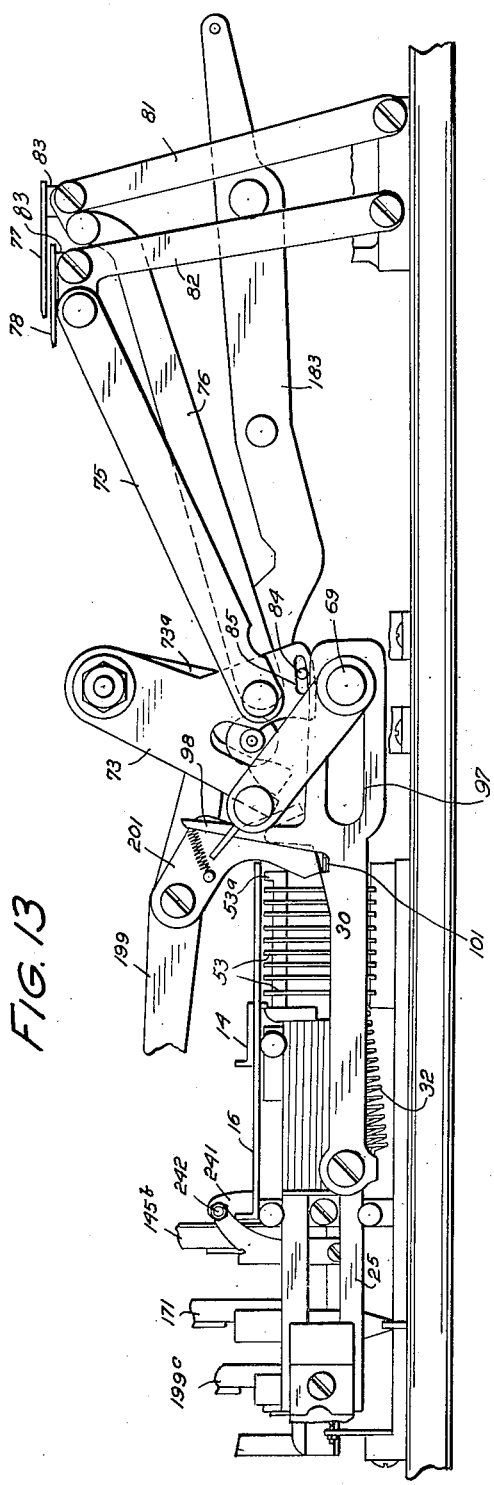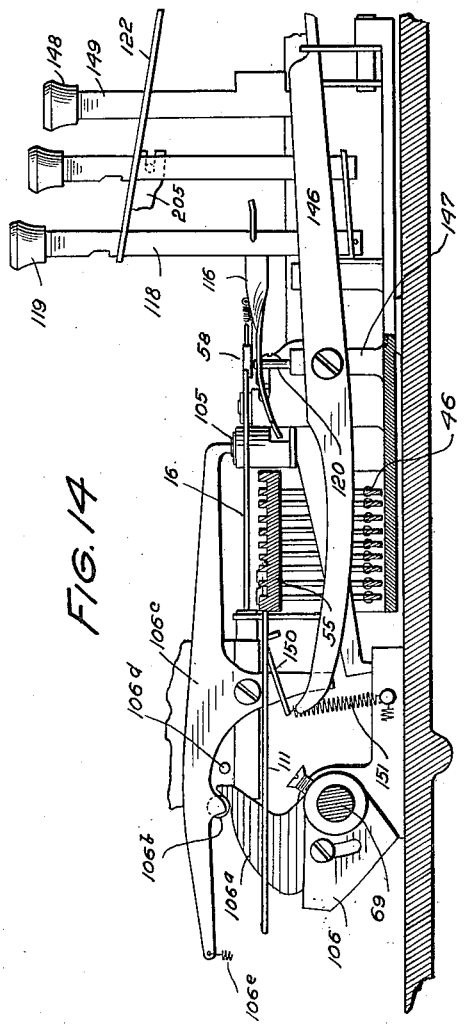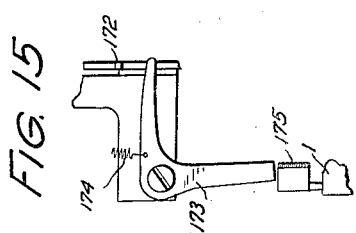

Dec. 4, 1928.
G. D. SUNDSTRAND
1,694,362
ADDING AND LISTING MACHINE
Filed Sept. 28, 1922
12 Sheets-Sheet 11
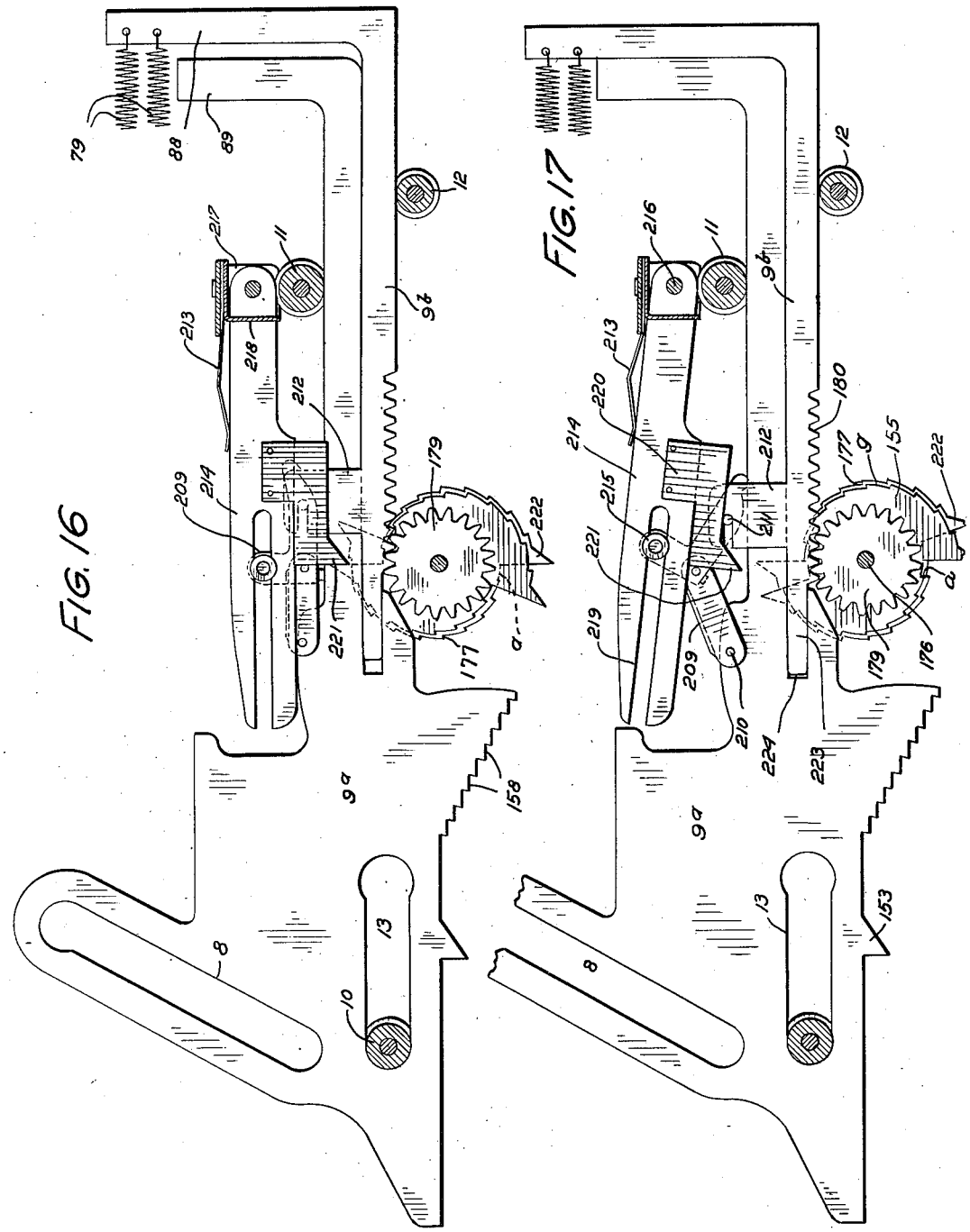
INVENTOR
G.D. Sundstrand
Attys Dec. 4, 1928.  1,694,362
G. D. SUNDSTRAND
ADDING AND LISTING MACHINE
Filed Sept. 28, 1922    12 Sheets-Sheet 12
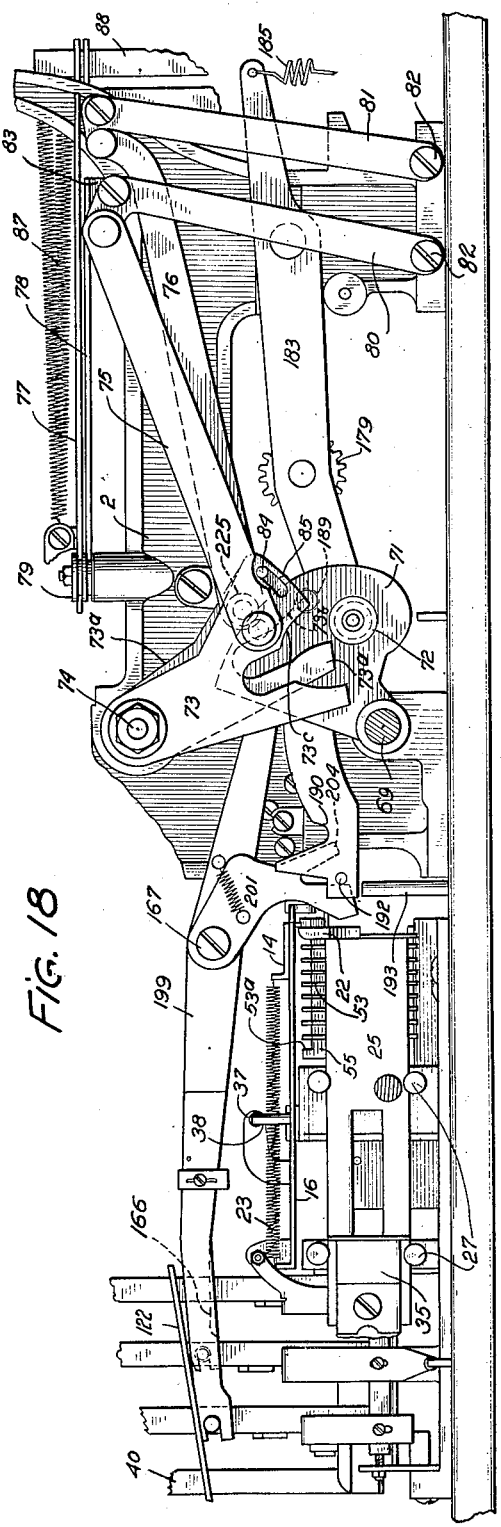
INVENTOR
G. D. Sundstrand
By Chindahl, Parker & Carlson
Attys Patented Dec. 4, 1928.

1,694,362

UNITED STATES PATENT OFFICE.

GUSTAF DAVID SUNDSTRAND, OF ROCKFORD, ILLINOIS, ASSIGNOR, BY MESNE ASSIGNMENTS, TO SUNDSTRAND CORPORATION, OF WILMINGTON, DELAWARE, A CORPORATION OF DELAWARE.

ADDING AND LISTING MACHINE.

Application filed September 28, 1922. Serial No. 591,037.

The invention relates to adding and listing machines of the general character shown in my prior Patent No. 1,329,028 issued January 27, 1920.

The object of the invention is to produce a machine of simplified contruction which is capable of rapid and accurate operation.

Among the important improvements of the machine are, a novel setting-up mechanism, an advantageous printing mechanism operated to effect the printing operation during the return stroke of the handle and after the type bars have been allowed ample time to come to rest, and a simplified means for clearing the totalizing mechanism.

The objects of the invention thus generally stated, together with ancillary improvements and advantages, are attained by the construction illustrated in the accompanying drawings wherein I have shown a preferred embodiment of the invention. It is contemplated, however, that various changes in the form, construction and arrangement of the parts may be made by those skilled in the art without departing from the spirit and scope of the invention as expressed in the appended claims.

Figure 1:
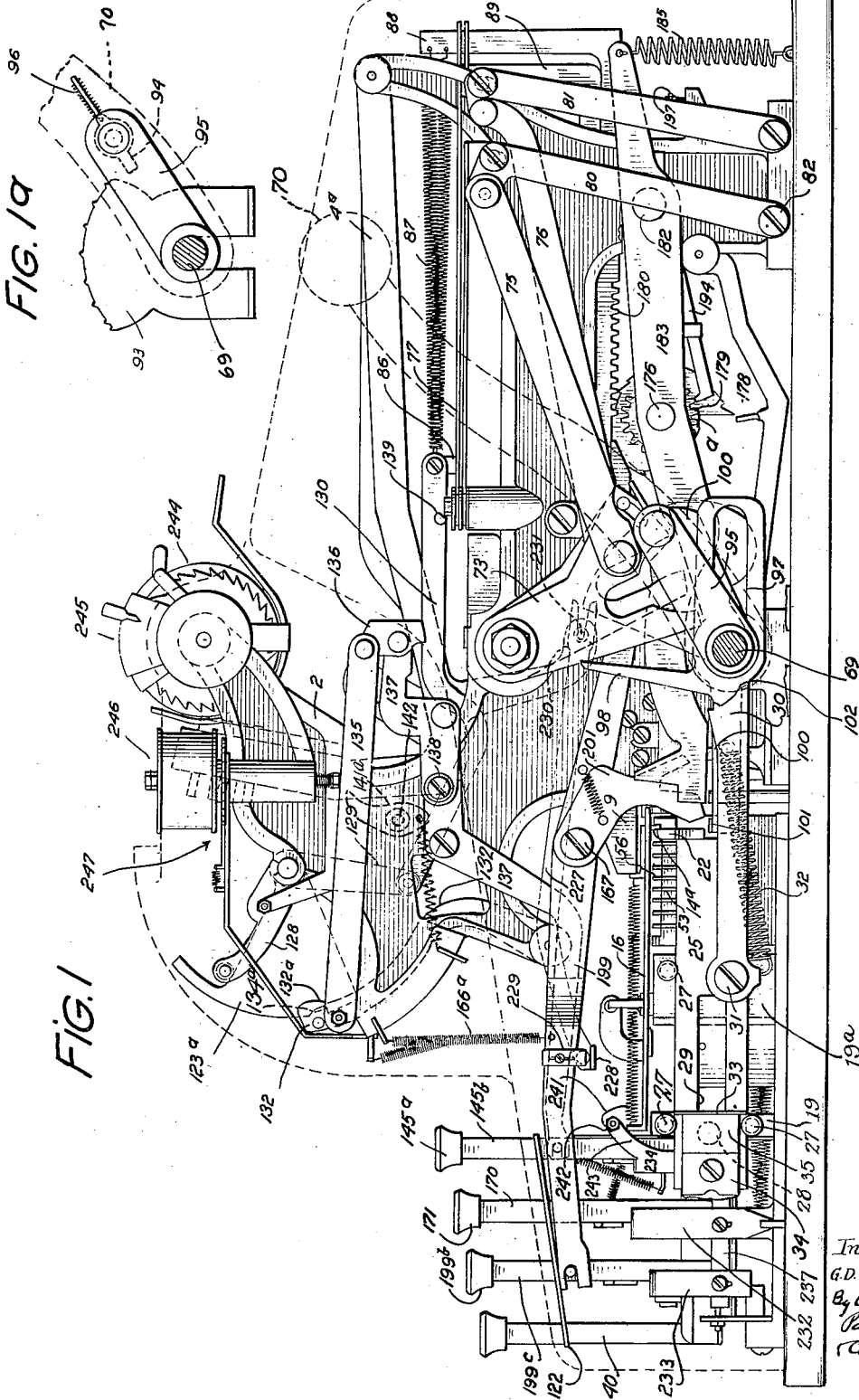
Figure 2:
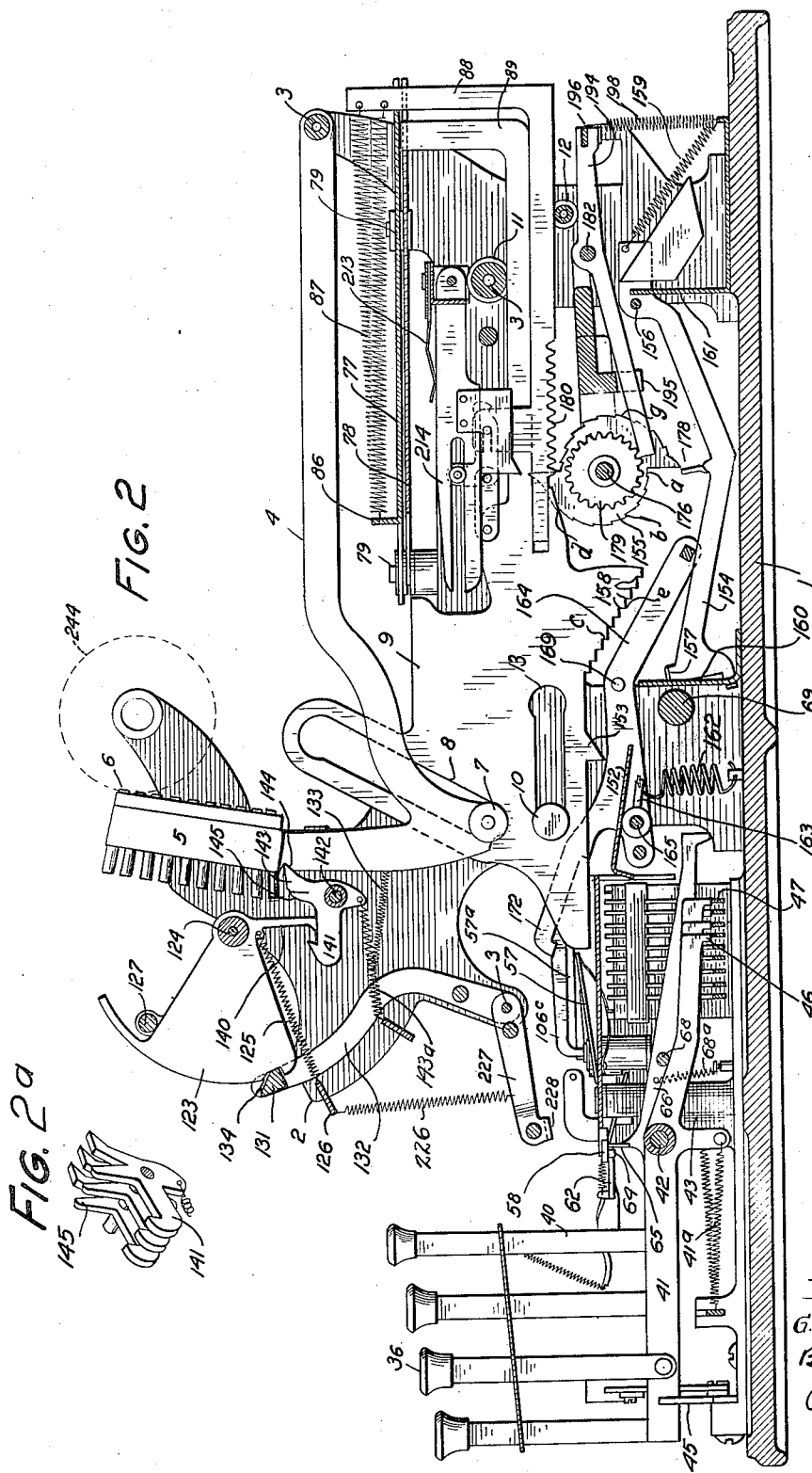
Figure 3:
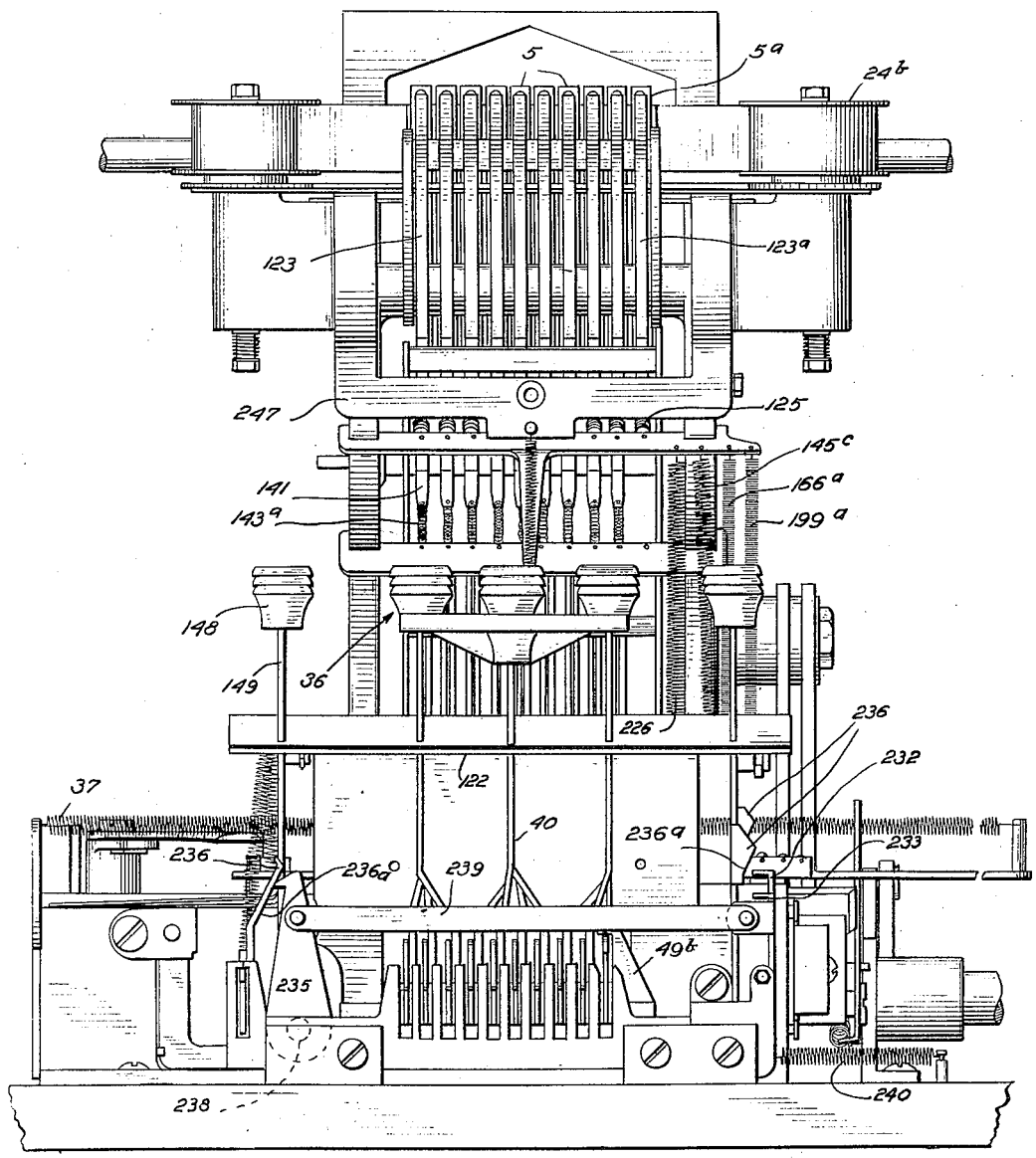
Figure 4:
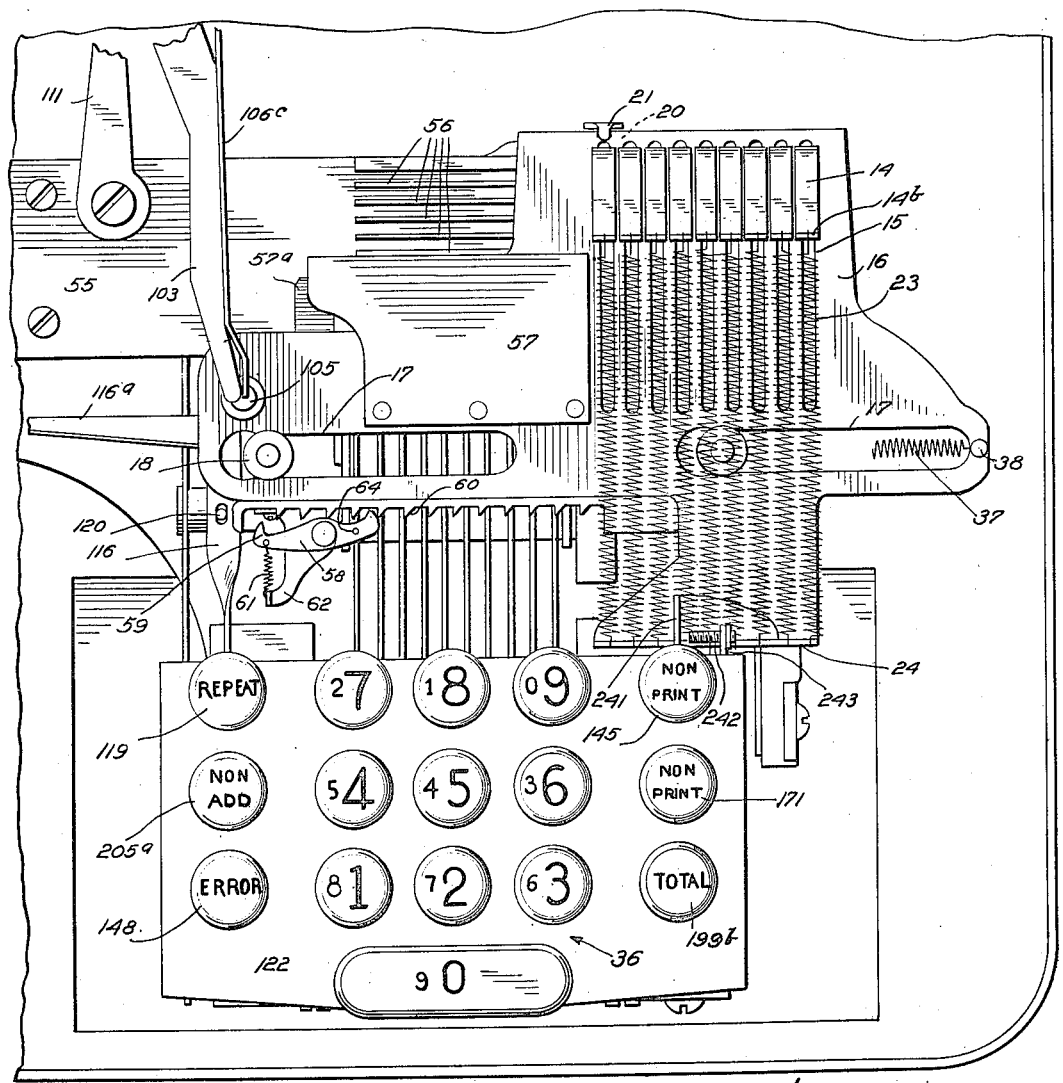
Figure 5:
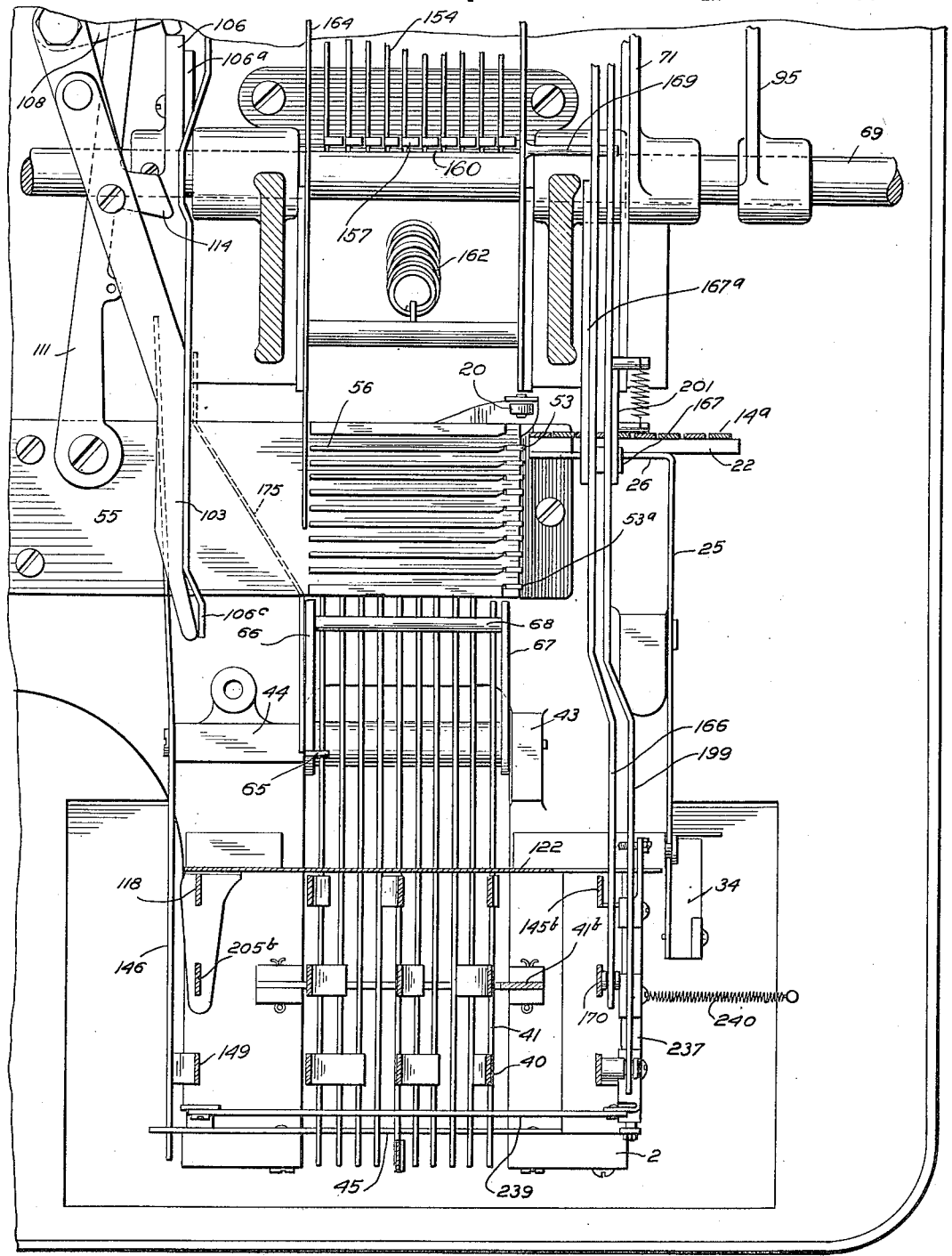
Figure 9:
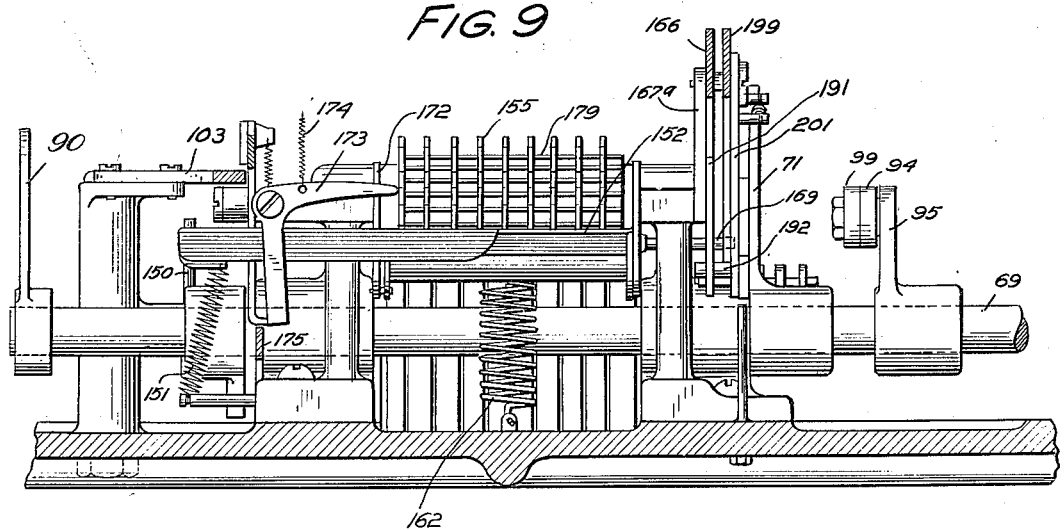
Figure 10:
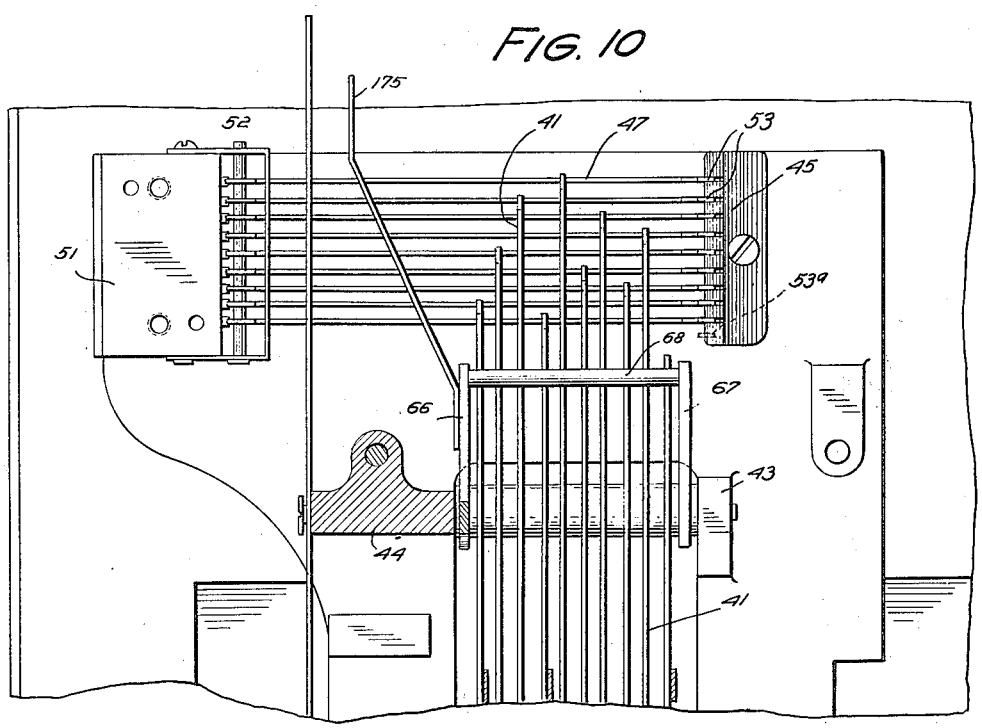
Figure 11:
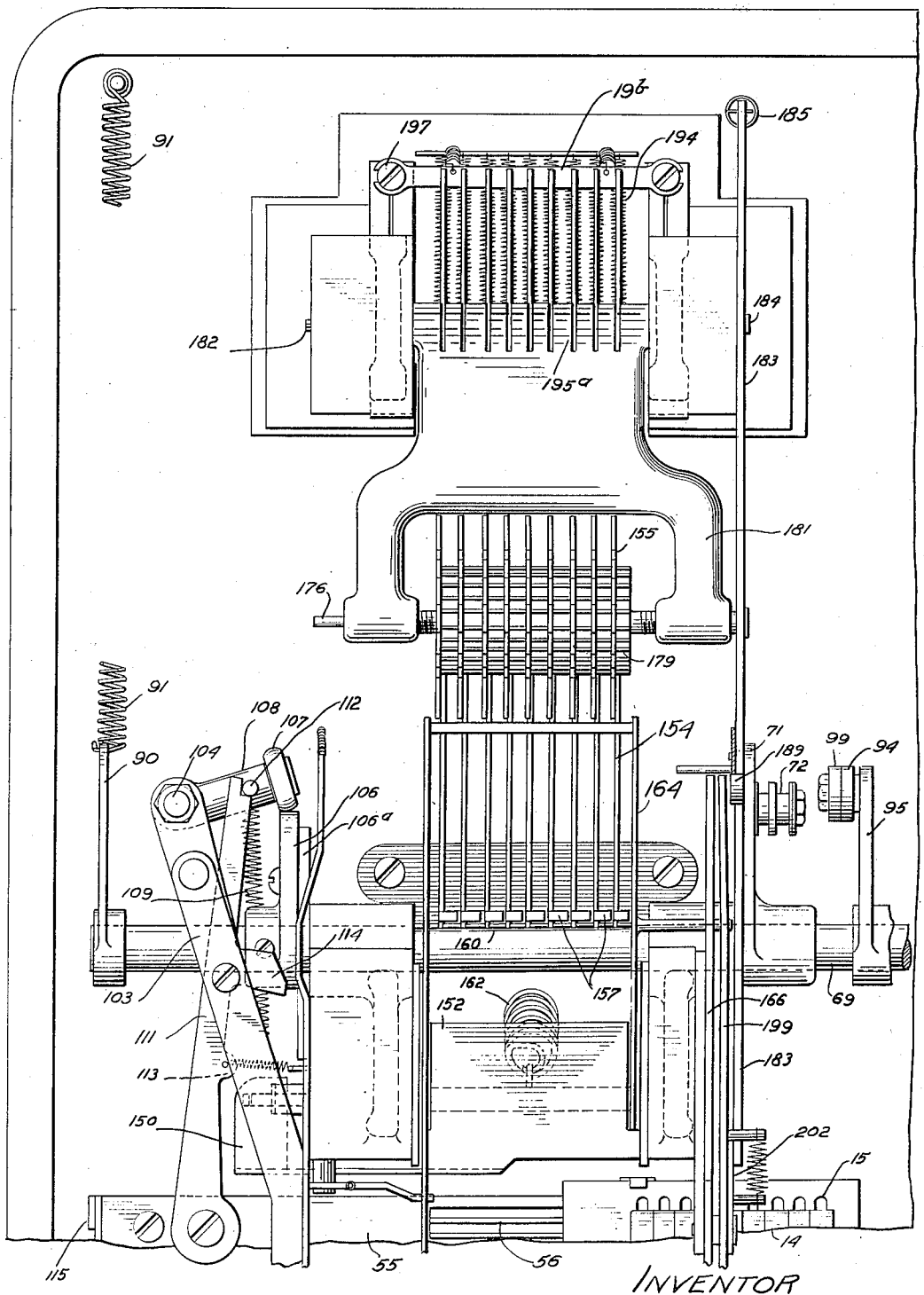
Figure 12:
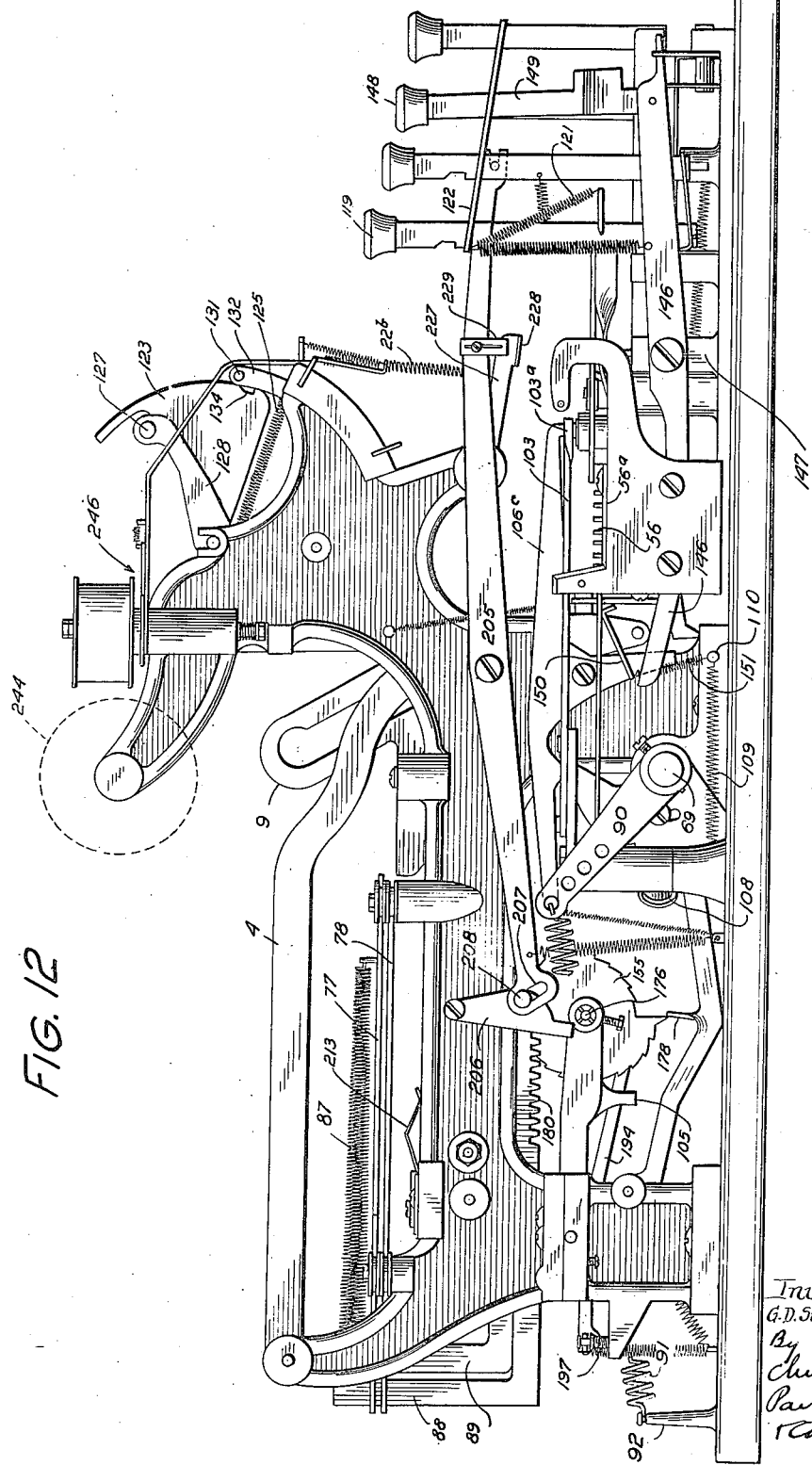

Figure 1 of the drawings is a side elevation of an adding machine embodying my invention, the cover or casing being shown in broken lines. Fig. 1ª is a fragmentary detail view of a means for compelling a full stroke of the operating handle. Fig. 2 is a vertical sectional view through the machine. Fig. 2ª is a detail view showing a part of the printing mechanism. Fig. 3 is a front elevational view of the machine. Fig. 4 is a fragmentary plan view illustrating the forward portion of the machine. Fig. 5 is a fragmentary horizontal section through the lower portion of the machine. Figs. 6 and 7 are fragmentary vertical sectional views respectively looking rearwardly and forwardly of the machine and illustrating the setting-up mechanism. Fig. 8 is a detail view of a portion of the means for returning the carriage of the setting-up mechanism, and illustrating particularly the means for rendering inoperative devices for returning the carriage for purposes of accomplishing a repeating of the printing and adding operations. Fig. 9 is a fragmentary vertical sectional view looking toward the rear and illustrating the means for preventing the operation of the printing and adding mechanism in case of error. Fig. 10 is a fragmentary horizontal sectional view showing in top plan the key-controlled setting-up mechanism. Fig. 11 is a similar view but illustrating the totalizing mechanism and the operation of the setting-up mechanism including the means for restoring the latter to initial position. Fig. 12 is an elevational view looking at the side opposite that shown in Fig. 1. Fig. 13 is a fragmentary side elevation of the means actuated by the handle and operating the several mechanisms of the machine. Fig. 14 is a fragmentary longitudinal sectional view further illustrating the repeat mechanism. Fig. 15 is a fragmentary sectional view illustrating a detail of construction. Figs. 16 and 17 are fragmentary vertical sectional views illustrating the carrying means of the totalizing mechanism. Figs. 18 and 19 are fragmentary longitudinal vertical sectional views illustrating principally the totalizing and clearing mechanism.

The machine comprises a framework of usual construction embodying a base 1 and spaced side members 2 connected together by cross rods 3. Pivoted upon one of the rods 3 at the rear end of the framework are a plurality of levers 4 (nine in number) and 4ª (one in number) carrying at their forward ends type bars 5 and 5ª provided with a plurality of types 6. Near their forward ends the levers 4 are provided with rollers 7 engaging in upwardly and rearwardly inclined slots 8 of means for imparting up and down movement to the type bars. This means may comprise a plurality of plates 9 constituting elevators, and guided by means of grooved rollers 10, 11 and 12 for forward and rearward movement in the framework. The rollers 10 operate in slots 13 in the forward portion of the elevators and the rollers 11 and 12 engage with upper and lower edges respectively of the elevators near their rear ends. One elevator is provided for each of the nine type bars 5 and it will be apparent that the extent to which a type bar is raised will depend upon the extent of forward movement of its elevator. The type bar 5ᵃ is employed for printing symbols in connection with the error, total, clear and non-add keys, and the means for elevating the same will be described in connection with said mechanism.

Setting-up mechanism.

The means for determining the extent of such movement of the elevators 9 and hence the upward movement of the type bars 5 will now be described, reference being had to Figs. 2, 4, 5, 6, 7 and 10.

A plurality of movable elevator stops 14 are arranged in a transverse row for movement transversely of the machine, and are slidable in longitudinal grooves 15 provided in a plate 16. The latter is mounted for transverse movement and constitutes a carriage for said stops. Thus it is provided with a pair of aligned transverse slots 17 in which engage grooved rollers 18 adapted to guide the carriage in its transverse movement. The rear end of the carriage slidably engages with the upper end of a post 19, and the forward end of the carriage is supported between a roller 20 and a finger 21 (Figs. 4 and 5). Said stops 14 at their rear ends have depending lugs 14ᵃ (Fig. 5) and at their forward ends have upstanding lugs 14ᵇ. The latter are adapted to be engaged by the forward ends of the elevators 9, and the former are normally held in engagement with a transverse bar 22 by the action of coiled contractile springs 23 which connect the stops to a flange 24 at the rear edge of the carriage. The bar 22 is fastened upon the forward end of a longitudinally extending plate 25 (Fig. 5) bent inwardly at 26 for this purpose. Said plate is guided for longitudinal movement by two pairs of headed studs 27 mounted upon the side of the post 19 and also a second post 19ᵃ (Fig. 1). Still another guide stud 28 is provided upon the post 19 which operates in a longitudinally extending slot 29 in the plate 25. 30 is a link connected with the plate 25 at 31 and arranged to be reciprocated in the operation of the machine in a manner to be later described. A coiled contractile spring 32 normally holds the plate 25 and thereby the bar 22 in its rearmost position as determined by a stop member 33 rigid with the post 19 and adapted to be engaged by a stop device 34 fast upon the forward end of the plate 25 and embodying a rubber cushion.

The carriage 16 is moved transversely of the machine under the control of a plurality of digit keys 36, of which there are ten, which keys are adapted when depressed to actuate an escapement mechanism controlling the movements of the carriage under the pull of a spring 37. This spring is connected at one end to the right hand edge of the carriage as at 38 (Figs. 4, 6 and 7) and its other end is secured to a post 39 mounted at the opposite side of the machine.

Each of the keys 36 has a stem 40, the lower end of which is secured to a key lever 41 pivoted at 42 (Fig. 2) upon a rod mounted transversely of the machine in uprights 43 and 44. At their forward ends these key levers 41 are guided by a comb 45 (Fig. 5) secured at its opposite ends to the frame members 2. At their rear ends the key levers (with the exception of the "9" key lever) are provided with depending portions or toes 46 normally held by springs 41ᵃ (Fig. 2) downwardly upon transversely extending arms 47 of bell-crank levers 48 (Figs. 2, 6 and 7). The arms 47 thus limit upward movement of the forward ends of the keys from "0" to "8". The "9" key lever, not having engagement with an arm 47, has its upward movement limited by a stationary dog 41ᵇ.

The levers 48 are pivoted upon a rod 49 carried between a pair of arms 50 which in turn are fastened upon opposite sides of a block 51 at the left hand side of the machine. They are normally actuated by spring pressed plungers 52 to move the arms 47 upwardly when the latter are released by the upward movement of the toes 46 of the key levers, it being apparent from Fig. 2 that the key levers for the digits "0" to "8" are adapted to control respectively the several arms 47. Upon the free ends of the arms 47 are carried nine upstanding fingers 53, upward movement of which is limited by a projection 54 adapted to engage with a horizontal stationary plate 55 in which the upper ends of said fingers are guided; and forwardly of the foremost finger 53 is a stationary lug or finger 53ᵃ (Figs. 2 and 19). The upper ends of the fingers 53 project above the plate 55 and together with the lug 53ᵃ constitute stops with which the depending lugs 14ᵃ of the elevator stops are adapted to engage. As will be apparent from Fig. 5, the fingers 53 and 53ᵃ for the respective keys are arranged in longitudinal alinement, whereas the lugs 14ᵃ of the elevator stops are arranged in transverse alinement being held rearwardly of the transverse plane of the rearmost finger 53 by the bar 22. It will therefore be seen that if the carriage is moved to the left a distance equal to the space between the centers of two adjacent lugs 14ᵃ, the first one of said lugs will be positioned in longitudinal alinement with the fingers 53, 53ᵃ. Accordingly, as the carriage moves to the left and the lugs 14ᵃ are successively released from the bar 22,—the latter being of a length such as to terminate substantially flush with the inner edge of the first lug 14ᵃ,—the elevator stops of which said lugs form a part will move successively under the action of their springs 23 into engagement with the stop fingers 53.

For the purpose of maintaining the positions of the respective stops 14, a plurality of ribs 56 are formed upon the transverse plate 55 and arranged in transverse alinement with the respective fingers 53, 53ᵃ. By this arrangement it will be seen that as the carriage moves to the left the stops 14 move forwardly under the action of their springs until they engage with a stop finger 53 or 53ᵃ and then in the continued movement of the carriage, they engage with the continuing rib 56 and are held thereby against forward movement. The extent of forward movement of the elevators, therefore, corresponding to the keys which have been depressed, will be determined by the positions of the stops 14 controlled in turn by the stop fingers and their continuing ribs. As to the elevators of the keys which are not depressed and hence which have not moved forwardly, these are arranged to engage with a plate 57 (Figs. 2 and 4) formed of sheet metal and secured to its rear edge upon the upper side of the carriage immediately to the left of the stops 14, the rear edge of said plate 57 being spaced a short distance above the carriage so as to be engaged by such elevators as may be to the left of the stops 14. This plate is supported at its forward edge by a leaf spring 57ᵃ and hence is yieldable, to permit the forward movement of all the elevators in the totalizing operation, as will be hereinafter described.

Carriage escapement mechanism.

The escapement mechanism which I prefer to employ comprises simply a dog 58 pivoted between its ends and carrying at opposite ends teeth 59 (Fig. 4) which are adapted to engage with spaced teeth 60 formed at the forward edge of the carriage 16. A coiled contractile spring 61 is connected to one end of the dog 58 and its opposite end is connected to a bracket 62 which is mounted upon an upright 63 (Fig. 6) and which also carries the pivot for the dog. The end of the dog opposite the spring 61 has a depending pin 64 which is disposed in the path of a lug 65 (Fig. 2) carried upon an oscillatory arm 66. Said arm is rigid with a bail which is mounted upon the rod 42 and includes another arm 67, said arms being connected by a rod 68 (Fig. 5). It will be seen that when any of the keys 36 are depressed to raise the rear ends of the key levers 41, the rod 68 will also be raised swinging the lug 65 rearwardly and thereby moving the dog against the action of the spring 61 to permit the carriage to be moved to the left a distance of one tooth under the pull of the spring 37.

Operating mechanism.

The operating mechanism for the machine comprises a main rock shaft 69 located approximately centrally of the machine, transversely thereof, and suitably journaled in the side frame members 2. This rock shaft has the operating handle, indicated at 70 (Fig. 1) fast upon its right hand end. Also fast upon the shaft 69 is a cam member 71 carrying at its free end a pair of coaxial rollers 72 (Fig. 11). Said rollers are adapted to engage respectively with one of a pair of arms 73 and 73ᵃ (Figs. 1 and 18) mounted upon a post 74 a short distance above the shaft 69 and bifurcated at their free ends so as to be engaged by the rollers 72. Said arms 73 and 73ᵃ are connected respectively by means of links 75 and 76 with a pair of slide members or plates 77 and 78 guided by grooved rollers 79 for horizontal front to rear movement. The connection of said links 75 and 76 with the respective plates is effected through the upper ends of a pair of pivoted arms 80 and 81 mounted at their lower ends upon pivots 82 and connected at their upper ends to depending lugs 83 (Fig. 13) at the rear ends of the plates 77 and 78. Said arms 73 and 73ᵃ are connected together, for a purpose which will hereinafter appear, by means of a pin 84 carried by the arm 73ᵃ and engaging in a slot 85 formed in the arm 73.

Upon the forward end of the slide plate 77 are a plurality of upstanding lugs 86 (Fig. 2) connected by coiled contractile springs 87 with upstanding fingers 88 carried by the rear ends of the elevators 9. It will be apparent therefore, that when the main rock shaft is oscillated in a forward direction, the rollers 72 engaging with the arms 73 and 73ᵃ cause the slide plates 77 and 78 to move forwardly; and that in such forward movement of the slide plates the springs 87 are placed under tension and thus tend to draw the elevators 9 forwardly to the positions determined by such elevator stops 14 as may have been positioned by the depression of the keys 36, the remaining elevators to the left being stopped by the plate 57 on the carriage.

Upon the return movement of the rock shaft, the slide plates are also returned, and in such movement they engage respectively at their rear ends the upstanding fingers 88 and fingers 89 also provided at the rear ends of the elevators 9. Relative movement between the fingers 88 and 89 is permitted for purposes of the carrying mechanism to be hereinafter described, and the function of the two plates 77 and 78 is to return the elevators simultaneously, restoring the fingers 88 and 89 to their proper relative positions.

As is usual in machines of this class, the rock shaft is provided upon the side opposite the handle 70 with an arm 90 connected by a coiled contractile spring 91 (Fig. 12) with a post 92 at the rear end of the machine, this spring tending at all times to resist forward oscillation of the rock shaft and hence to return the same to its initial position. In order to prevent such return until a complete stroke of the handle has been effected, I provide a toothed segment 93 (Fig. 1ᵃ) adapted to be engaged by a pawl 94 carried by an arm 95 fast upon the shaft 69. A spring 96 tends to swing the pawl toward a central position so that in the movement of the arm 93 in either direction it engages with the teeth to prevent reverse movement until the pawl has travelled completely over the segment and its direction of inclination reversed.

The forward oscillation of the main rock shaft also serves to position the stop bar 22 forwardly of the foremost position of the stops 14, so that when the carriage is returned to its initial position, the return movement of the stop bar will engage with the depending lugs 14ª of said stops and restore them to their initial position rearwardly in the carriage. The means for accomplishing this result comprises the link 30 (Fig. 1) which is pivoted at its forward end to the plate 25. This link has its forward end slotted as at 97 so as slidably to engage the shaft 69 entered therein. An upstanding finger 98 on the link is arranged to be engaged by a roller 99 carried by the free end of the arm 95 to impart forward movement to the plate 25. Such movement takes place against the action of the spring 32, the forward end of which is connected to the link 30 and the rear end of which is connected to a pivoted member 100 mounted upon the shaft 69. The arrangement is such that the spring 32 exerts a downward pull upon the member 100, and such downward movement is limited by a lug 101 formed at the forward end of the member engaging the upper edge of the link. A notch 102 is formed in the upper edge of the link adjacent the base of the finger 98, and is adapted to receive the lug 101 in the forward movement of the link. The lug thus serves to hold the link and hence the bar 22 in its forward position until released. Such release is accomplished by the engagement of the roller 99 with the opposite end of the member 100 as shown in Fig. 1. This occurs as the rock shaft approaches its initial position. The result is that the bar 22 is held in its foremost position until after the return of the carriage to its initial position, in which movement the stops 14 are positioned rearwardly of the bar 22 so as to be carried rearwardly by the latter to their initial position.

*Carriage and stop restoring means.*

The means for returning the carriage to its initial position will now be described.

An arm 103 (Fig. 4) is pivotally mounted at its rear end to swing in a horizontal plane upon a post 104 (Fig. 11). The forward end of this arm extends over the left hand end of the carriage 16, and the latter is provided with a stud 105 adapted to be engaged by the arm. The latter is arranged to be swung in the movements of the shaft 69, being moved to the left in the forward oscillation of the shaft, and being returned in the rearward oscillation of the shaft to move the carriage to its initial position. The means for accomplishing this result comprises a cam member 106 fast upon the shaft 69 (Fig. 11) arranged to be engaged by a roller 107 upon the free end of an arm 108 rigid with the arm 103 and extending inwardly therefrom substantially at right angles thereto. A coiled spring 109 is connected to the arm 108 and to a stationary pin 110 (Fig. 12) and normally exerts a forward pull on the arm 108 and hence an outward pull upon the arm 103. Such outward movement is normally restrained, however, by a pivoted member 111 notched at its free end so as to engage with a pin 112 carried by the arm 108, being held in such engagement by means of a coiled spring 113. Rigid with the member 111 is an inwardly projecting lug 114 having its rear edge inclined and adapted to be engaged by the cam member 106 in its forward movement. Said cam member is so shaped that as it moves forwardly the roller 107 also tends to move forwardly under the action of the spring 109, but such forward movement of the roller and hence the outward movement of the arm 103 is restrained by the member 111 until the forward edge of the cam 106 engages with the lug 114. This has the effect of disengaging the member from the pin 112 whereupon the spring 109 rapidly swings the arm to its outermost position as determined by a cushioned stop 115 (Figs. 6 and 11). Upon the return oscillation of the shaft, the cam 106 engages the roller 107 and positively moves the arm 103 inwardly, and the latter engaging with the stud 105 upon the carriage restores the carriage to its initial position.

Rigid with the cam 106 is a second cam 106ª (Fig. 14) which is adapted to be engaged by a roller 106ᵇ carried by a lever 106ᶜ pivoted between its ends and normally held downwardly at its rear end against a stop 106ᵈ by means of a spring 106ᵉ. The extreme forward end of this lever overlies the stud 105, and the cam is so shaped that as the main rock shaft 69 returns to its initial position, such forward end of the lever engages with the stud and holds it in a lowered position such that when the carriage is moved to the left under the control of an escapement mechanism, the stud will clear the forward end of the arm 103. Thus the carriage will be permitted to move to the left while the arm 103 remains stationary in its inward position. In order that said arm may be swung past the stud after the latter has moved outwardly with the carriage, the outer forward edge of the arm is inclined as shown at 103ª (Fig. 12) so as to force the stud downwardly with a cam action as it passes thereover. The parts are so proportioned and arranged that the return movement of the carriage occurs prior to the rearward movement of the bar 22, and hence the stops 14 to their initial positions. This insures that in each operation, the stops 14 will be restored to their initial positions ready for the next operation.

Repeat mechanism.

It is sometimes desirable to repeat the addition and printing of a particular item without necessitating a resetting of the stops. To accomplish this result I employ in the present instance a key-controlled means for rendering inoperative the means for returning the carriage after the same has been moved to an operative position in the setting up of the proper stops. This means (Figs. 4 and 8) comprises simply a lever 116 having at its rear end a laterally extending arm adapted to engage with a head 105ª fastened upon the lower end of the stud 105 and operable in any position of the carriage to move the stud downwardly in the carriage 16 against the action of the coiled spring 117 which normally tends to hold the stud in elevated position. A key stem 118 carrying a key 119 is rigid with the lever 116, and the latter is guided for vertical movement by a pin 120. Downward movement of the key stem is re-resisted by a spring 121 (Fig. 12) the upper end of which is anchored to a plate 122 by which the various key stems are guided in their up and down movements. The arrangement is such that upon the depression of the key 119 the stud 105 is moved downwardly out of the path of movement of the arm 103 so that the latter is thus rendered ineffective to restore the carriage to its initial position, thus leaving the setting-up mechanism in position for repeated addition and printing of the item set up by the operator.

Printing mechanism.

Any suitable means may be employed for actuating the types of the type bars to print. Preferably, however, I employ a construction such that the printing occurs during the return oscillation of the shaft 69, thus allowing the type bars ample time to come to rest in printing position, before the printing operation takes place.

Referring to Figs. 1 and 2, the hammers for driving the types of the type bars 5 to print are indicated at 123. These are pivotally mounted upon a cross rod 124 mounted in the side frame members 2, and one is provided for each of the type bars 5. Coiled springs 125 are connected to the hammers below their pivotal axis and to a cross bar 126 also mounted in the side frame members 2, and said springs tend to move the hammers rearwardly to print. A bail consisting of a rod 127 and side members 128 is also pivoted upon the rod 124 and rigid with said bail is a depending arm 129 which is connected by means of a link 130 with the upper slide member 77. The latter, it will be remembered, is connected with the main rock shaft 69 for reciprocation thereby. The arrangement is such that in the forward movement of the slide member 77 the bail moves rearwardly to permit the hammers to drive forwardly when released in a manner to be presently described, and when the slide member moves rearwardly, the bail restores the hammers to their initial position, placing the springs 125 under tension. Thus the bail through its operative connections with the main rock shaft constitutes a tensioning means for the springs 125 of the hammers.

For holding the hammers in their cocked positions until the time arrives for their release to drive the types to print, I provide a secondary control means such as a bail comprising a cross bar 131 carried by side members 132 which latter are pivotally mounted at their lower ends upon the cross rod 3 between the frame members 2. The cross bar 131 is normally held by a spring 133 in engagement with notches 134 provided in each of the hammers, whereby to hold the latter in position with their springs 125 under tension after the bail 127 moves rearwardly in the forward oscillation of the main shaft 69.

For moving the cross bar 131 so as to release the hammers, I provide a link 135 connected near the upper end of one of the side members 132 of the bail (Fig. 1), the rear end of which link is pivoted to a plate 136 which in turn is pivoted upon an arm 137 pivoted at 138 upon a side frame member 2 of the machine. The lower end of the plate 136 is disposed in the path of movement of a pin 139 carried by the link 130 near the rear end of the latter, said link, by reason of its connection with the arm 129, having a slight pivotal movement, which carries the pin upwardly into engagement with the plate 136. In the forward movement of the pin the arm 137 and hence the plate 136 is arranged to yield upwardly so that no longitudinal movement is imparted to the link 135. When, however, the pin 139 moves rearwardly in the return oscillation of the shaft 69, it engages with the lower end of the plate 136 and effects a pivotal movement of the latter sufficient to move the link 135 and thereby the bar 131 forwardly out of the notches 134 of the hammers. Thus all of the hammers are released for rearward movement under the pull of their springs 125.

However, only such of the hammers as correspond to type bars which have been elevated are permitted to print. To accomplish this result I provide upon each of the hammers a tail piece 140 (Fig. 2) the lower end of which overlies a hook member 141 pivoted upon a cross rod 142 between the side frame members 2. Said hook members have upwardly and rearwardly projecting portions 143 each forced by a spring 143ª into engagement with a notch 144 provided in the forward edges of the several type bars 5. When the type bars are elevated, the portions 143 moving out of the notches 144 engage with the forward edges of the type bars and thus move the hooked ends of the members downwardly. Such downward movement is sufficient to enable the tail piece 140 of the hammers to clear such of the hook members as may have been thus moved downwardly. If the type bars do not rise, the hook members will, of course, remain stationary, and the tail pieces of the corresponding hammers will engage with the hook members and thus restrain them from printing.

Normally the type bars are located with the ciphers in position to print. In order therefore to cause the printing of ciphers notwithstanding the fact that the type bars are not elevated for this purpose, the hook members are each provided with a portion 145 inclined to the left so as to overlap the hook member which is positioned to the left. The result of this construction is that when one of the hook members is depressed by the upward movement of a type bar all of the hook members to the right thereof are correspondingly depressed to release the corresponding hammers to print ciphers.

Nonprint mechanism.

If it is desired to prevent the hammers from being released to print, a key 145ᵃ carried upon a stem 145ᵇ is depressed. Connected to this key is the forward end of the arm 137, and it will be seen that the effect of depressing the key is to carry the plate 136 above the path of movement of the pin 139. A coiled spring 145ᶜ tends to hold the plate 136 downwardly.

Error mechanism.

If the operator should make an error in setting up the stops 14, it becomes necessary to prevent operation of the printing and adding mechanisms. This is accomplished in the present instance by holding the elevators in their initial rearward position while the rock shaft is oscillated to return the carriage to its initial position. A simple form of means for accomplishing this result comprises a lever 146 (Fig. 14) pivoted between its ends at 147 and arranged to be swung by the depression of a key 148 carried by a stem 149. The rear end of the lever slidably engages with the underside of an arm 150 pivoted near its forward edge and normally drawn downwardly at its rear edge by means of a spring 151. Rigid with said arm is a plate 152 (Fig. 2) the forward edge of which is of sufficient length to extend across the entire group of elevators (see Fig. 11) and normally occupies a position a short distance below their lower forward edges. When the key 148 is depressed to swing the lever 146, the upward swinging movement of the arm 150 imparts a similar upward movement to the plate 152. Upon the lower edge of each of the elevators is a projection 153 which is adapted to engage with the rear edge of the plate 152 when thus elevated. Thus when the error key is depressed, the elevators are held in their rearward position while the main shaft is oscillated to restore the carriage to its initial position.

Totalizing mechanism.

The mechanism whereby the total of a number of items may be taken comprises generally total-stop means for limiting the forward movement of the elevators in accordance with the numeral to be printed thereby, and total-stop wheels for controlling the operation of said stop means.

Referring to Figs. 2, 11, 16, 17, 18, and 19, I provide a series of nine total stops 154, one for each of the type bar elevators 9. These stops are adapted to limit the forward movement of the elevators when a total is to be printed. Each of the total stops has ten positions corresponding to the ten different positions assumed by the elevators in printing from zero to nine. The proper positions of the total stops for printing a given total are determined by nine stop wheels 155 arranged to be rotated in the advance movements of the type bar elevators that are used in printing items to be added.

Each total stop 154 consists of a lever loosely mounted on a shaft 156 so that said lever may be swung up to present a stop lug 157 in the horizontal plane of ten stop shoulders 158 on the adjacent elevator 9. When raised into the plane of the topmost shoulder 158, the stop lug 157 prevents movement of the elevator and thus holds the corresponding type bar in position to print a cipher. When raised into the plane of the lowest shoulder 158, the stop lug permits the elevator to make its full forward movement, thus placing the type bar in position to print a "9." The total stops are raised by springs 159, and lateral displacement of the stops is prevented by forward and rear combs 160 and 161. The total stops are normally held in lower inoperative position by means of a spring 162 acting upon an arm 163 fixed relative to a bail 164. The side arms of said bail are loosely mounted on a shaft 165 and the transverse bar of the bail lies across the total stops 154. 166 (Figs. 5 and 19) is a total key lever pivoted between its ends at 167 upon a bracket 167ᵃ and having a hook 168 at its rear end engaging with a stud 169 upon the bail 164. The forward end of said lever is pivoted to a stem 170 carrying a total key 171 upon the depression of which the bail 164 is raised permitting all of the total stops 154 to swing up, under the action of their springs 159, and assume the positions determined by the stop wheels 155 to be presently described. A coiled spring 166ª resists such downward movement of the key lever.

The bail 164 has a forwardly projecting finger 172 (Fig. 2) rigid therewith and overlying at its forward end the plate 57. When the bail is raised by the depression of the total key, the finger 172 acts to depress the plate 57 against the action of the spring 57ª. Accordingly, the elevators are permitted to clear the plate 57 in order to effect the printing of the total. Depression of the finger 172 also serves to swing a bell-crank lever 173 (Figs. 9 and 15) against the action of a spring 174 into a position overlying an arm 175 which is rigid with the arm 66 (Fig. 10) of the bail overlying the key levers 41. This construction serves to prevent the operation of the keys 36 and hence a setting up of the elevator stops during the operation of taking a total, which obviously would render the total inaccurate.

The stop wheels 155 (Figs. 2, 16 and 17) are rotatably mounted on a shaft 176 and each has two semi-circular series of stop shoulders 177, the shoulders of each series being located at different distances from the center of the wheel. On each total stop 154 is a finger 178 adapted, when the total stop is raised, to make contact with one of the shoulders 177 on the stop wheel. It will thus be seen that the extent of upward movement of the total stop will depend upon the position of the stop wheel.

The stop wheels are rotated through connections with the type bar elevators 9. Herein this connection consists of a pinion 179 fixed to each of the stop wheels and adapted to mesh with rack teeth 180 formed on the lower edges of the type bar elevators. The pinions 179 of the stop wheels 155 are normally rotated during the forward movement of the elevators, but not during the return movement. To obtain this result, the shaft 176 is mounted in a yoke 181 (Fig. 11) which in turn is pivoted on a cross rod 182 (Fig. 2) in the framework of the machine. A lever 183 is pivoted between its ends as at 184 (Fig. 1) and its rear end is drawn downwardly by means of a spring 185. Forwardly of its pivot 184 said lever 183 is pivoted to the yoke 181 upon the shaft 176, so that the spring 185 thus tends at all times to move the pinions 179 upwardly into engagement with their respective racks 180. Such upward movement, however, is restrained by a pivoted latch member 186 (Fig. 19) normally drawn by a spring 187 toward a pin 188 on the lever 183. A stud 189 carried by the cam 71 (Fig. 18) controls the movement of the latch member 186, and the arrangement is such that in the forward movement of the main rock shaft 69, the stud 189 engages the latch member 69, the stud 189 engages the latch member and moves it rearwardly sufficiently to enable the pin 188 on the lever to clear the same. As the rock shaft 69 approaches the limit of its forward oscillation, the stud 189 re-engages the extreme forward end of the lever 183 (Fig. 19) at 190 and thus forces it downwardly to carry the pinion 179 out of engagement with its rack 180. The lever 183 is at the same time re-engaged by the latch member 186, and held thereby in its lowered position. Consequently, in the return movement of the rock shaft toward its initial position, the pinions 179 are disengaged from the racks 180.

When a total is to be printed, the stop wheels 155 must be stationary during the forward movement of the type bar elevators, and therefore the pinions 179 must not be placed in mesh with the racks 180. To accomplish this result I provide a finger 191 rigid with the total key lever 166 (Figs. 9 and 19) and adapted to engage with a pin 192, projecting inwardly from the extreme forward end of the lever 183, when the latter is held downwardly by the latch member 186. Such engagement takes place when the total key lever 166 is depressed, and since the key is held in its downward position during the operation of taking a total, it will be obvious that the pinions 179 are held out of mesh with the racks 180, and that such position of the lever 183 is maintained until the latch member is actuated by the return movement of the cam 71 and its stud 189. Downward movement of the forward end of the lever 183 may be limited in any suitable way, as by means of a post 193.

For the purpose of preventing rotation of the pinions 179 through momentum I provide an extremely simple and yet effective means consisting of a series of levers 194 loosely mounted upon the cross rod 182 (Fig. 2) and guided near their forward ends in a comb 195, and near their rear ends in a comb 195ª formed by the rear end of the yoke 181 (Fig. 11). The rear ends of the levers 194 are bifurcated to engage a cross bar 196 having a limited up and down movement as permitted by a pair of screws 197 (Fig. 19) carried upon headed screws 197ª, the levers being normally drawn downwardly by means of a pair of springs 198. The arrangement is such that when the pinions move upwardly into mesh with the racks 180, upward movement of the forward ends of the levers is limited by the heads of the screws 197ª so as to disengage the forward toothed ends of the levers from the pinions and thus permit the latter to be rotated in the forward movement of the elevators. As soon, however, as the pinions move downwardly, at the end of the forward stroke of the hand lever they re-engage with the levers 194 which effectively serve to stop any rotation which may have been imparted thereto by reason of their connection with the elevators. The downward movement of the levers 194 is limited by the heads of the screws 197.

Clearing mechanism.

For the purpose of clearing the machine, that is to say, to restore the stop wheels 155 to their initial positions, I preferably employ a means under the control of a key lever for preventing engagement of the pinions 179 with their racks in the forward movement of the elevators, but permitting such engagement during the return movement of the elevators. This means in the present embodiment comprises a key lever 199 having a movement resisting spring 199$^a$ and carrying a key 199$^b$ upon a stem 199$^c$. The lever is pivoted upon the stud 167 carried by the bracket 167$^a$ (Fig. 5) and also has a hooked portion 200 at its rear end, which is adapted to engage with the pin 169 of the bail 164 whereby to cause the total stops 154 to rise into engagement with the stop shoulders 158 of the elevators. The means provided in this instance for holding the pinions 179 out of mesh with their racks consists of a latch member 201 pivoted on the stud 167 (Fig. 19) and normally held by a spring 202 in contact with a pin 203 on the lever 199. The forward end of the lever 183 being held downwardly by the latch member 186, the depression of the clear key lever 199 causes the latch member 201 to slide over the pin 192 at the extreme forward end of the lever 183. Said latch member carries a rearwardly projecting arm 204 and this arm is moved rearwardly when the key lever 199 is depressed, so that when the cam 71 approaches its foremost position the stud 189 engages with said arm 204 and disengages the latch member 201 from the pin 192. Thereupon the spring 185 acting upon the rear end of the lever 183 swings the latter to carry the pinions 179 into engagement with the racks 180, and the latter in their rearward movement thus actuate the pinions to restore the stop wheels 155 to their initial positions.

Add mechanism.

When it is desired to print an item without adding the same, a non-add key lever 205, carrying a key 205$^a$ upon a stem 205$^b$, is depressed to effect the desired result. The means actuated by this key lever comprises a detent member 206 (Fig. 12) normally occupying a position rearwardly of the shaft 176 upon which are mounted the total wheels 155 and pinions 179. The key lever 205 has an inclined slot 207 in its rear end engaging a stud 208 on the detent member 206. The arrangement is such that upon the depression of the key lever 205 the detent member is drawn forwardly directly over the shaft 176, and thus prevents the pinions from being moved into mesh with their racks 180. Forward movement of the elevators, however, is not prevented so that the item may be printed though not added.

Carrying mechanism.

The elevators 9 are, as hereinbefore mentioned, made of sectional construction, reference being made to Figs. 2, 16 and 17. This construction is employed for purposes of the carrying mechanism to be now described.

As shown in said figures, each of the elevators (Figs. 16 and 17) is formed with a main portion 9$^a$ having the finger 89 rigid with its rear end, and an auxiliary portion 9$^b$ carrying the finger 88 at its rear end, the latter extending above the upper end of the finger 88 for connection with the springs 79 which serve to move the elevators forwardly when the slides 77 and 78 are actuated. The two sections 9$^a$ and 9$^b$ are normally held in longitudinally separated relation by a toggle 209 one portion of which is pivoted at 210 to the main section 9$^a$ and the other portion of which is pivoted at 211 between a pair of spaced lugs 212 rising from the auxiliary section 9$^b$. A leaf spring 213 acting through a lever 214 and a roller 215 tends normally to hold the toggle straight, as shown in Fig. 16. Said lever 214 is pivoted upon a cross rod 216 mounted in brackets 217 which are carried in the framework of the machine. Said bracket also carries a comb 218 for maintaining the levers in proper relation, there being one lever for each of the elevators. The roller 215 is carried upon an upward extension of one of the portions of the toggle, and to receive the roller the lever 214 is slotted at its forward end as at 219. Each of said levers 214 carries upon one side a plate 220 having a depending projection or tooth 221 which overlies the stop wheel to the right of the elevator upon which it is mounted. The stop wheel in turn has at the end of each of its segmental portions a radially projecting cam tooth 222 which is adapted to engage with the projection 221 for the purpose of flexing the toggle and thereby permitting relative movement between the sections of the elevator. Such movement is accomplished by the spring 79 acting upon the section 9$^b$ of the elevator to force the latter forwardly relative to the main section 9$^a$ until the finger 88 engages the finger 89. To permit of such relative movement the rear section is provided with a tongue 223 adapted to engage slidably in a slot 224 in the forward section. The sections are maintained in proper relation by the rollers 11 and 12 and by the lugs 212.

It will be apparent that after the total wheels have been rotated through a distance of nine stops, the tooth 222 at the end of such series of nine stops engages with the projection 221 of the next adjacent elevator and flexes the toggle 209 so as to cause the section 9ᵇ of such elevator to move forwardly relative to the section 9ª; and inasmuch as the racks 180 are rigid with the sections 9ᵇ such forward movement of the latter will rotate its corresponding stop wheel a distance equal to one stop shoulder. Thus in every instance after the accumulation of nine digits by one stop wheel, the next movement of the latter to accumulate one or more additional digits, serves to carry the tenth digit to the next stop wheel so that the entire number of digits will be accumulated by the two adjacent stop wheels, the tens accumulated by the units stop wheel being carried to the tens stop wheel, and the hundreds accumulated by the tens stop wheel being carried to the hundreds stop wheel, and so on.

For the purpose of restoring the sections 9ª and 9ᵇ to their initial positions, the slide members 77 and 78 are employed to engage respectively at their rear ends with the fingers 88 and 89. The upper slide member must therefore be given a slightly greater rearward movement than the lower slide member as will be apparent from a comparison of Figs. 16 and 17 in order to effect the longitudinal separation of the sections of the elevators. As will be remembered, these slide members are actuated by links 75 and 76 operatively associated with the cam member 71 which is fast upon the main rock shaft 69, forward movement of the cam member serving to swing the arms 73 and 73ª by the engagement of the roller stud 72 therewith, and thereby actuating the links 75 and 76. The arm 73ª is arranged to be first engaged by the stud 72 (see Fig. 18) so that upon the initial forward oscillation of the main shaft the upper slide plate is moved forwardly to permit of the forward movement of the auxiliary section 9ᵇ should the toggle 209 be flexed. In the return oscillation of the shaft the movement of the upper slide plate is accelerated as it approaches its rearmost position, to effect the re-separation of the sections. This is accomplished by the engagement of the roller 72 of the cam 71 with the forward edge 73ᵇ of the rearward portion of the arm 73ª, the corresponding edge 73ᶜ of the arm 73 being cut away. For completing this movement of separation and maintaining the relation after the roller 72 becomes disengaged from the arm 73ª a roller 225 upon the arm 73ª is arranged to be engaged by the cam 71 (Fig. 18) as the latter approaches its initial position.

Signal printing mechanism.

For the purpose of indicating when a total is taken; when a total is printed but not added; when an item is not printed but added; and when the machine is clear; I provide means actuated by the several key levers of the mechanisms referred to for moving an additional type bar 5ª (Figs. 1 and 3) carrying types for printing symbols which are indicative of the operation of the respective mechanisms. The means for moving this type bar for purposes of elevating it to the proper height to print a particular symbol, comprises a bail 227 (Fig. 2) mounted upon the cross rod 3 near the forward end of the framework and having at its forward end, upon each side thereof, outwardly extending plates 228 (Fig. 1) which are adapted to be engaged by fingers or stems 229 carried by the respective key levers and adjustable vertically to vary the extent of depression of the bail by a given key lever whereby to regulate the height to which the type bar is elevated in accordance with the symbol to be printed. The means for elevating said type bar 5ª is an arm 230 (Fig. 1) extending rearward from the bail 227 and bifurcated at its rear end to receive a pin 231 carried by a type bar lever 4ª upon which the type bar 5ª is carried. A coiled spring 226 (Figs. 2 and 3) is adapted to resist downward movement of the bail to elevate the type bar 5ª.

It will be seen that upon the depression of either the non-add key, the non-print key, the total key or the clear key, said type bar 5ª will be elevated to printing position.

The hammer 123ª for driving the types of this bar to print, is of a construction similar to the hammers 123 except that the arrangement is such that this hammer is released upon the forward stroke of the handle instead of upon the return stroke thereof as is the case with the other hammers. To accomplish this result no hook member 141 is employed in connection with this hammer, but a dog 141ª pivoted on the rod 142 is arranged to engage with the lower end of the type bar to limit its downward movement.

The means for moving the cross bar 131 sufficiently to clear the notch 134ª of the hammer 123ª comprises the free end of the arm 129 (Fig. 1) engaging with a nose 132ª formed upon the upper end of one of the arms 132 carrying the bar 131. The arrangement is such that as the rock shaft is oscillated to its forward extreme position, the end of the arm 129 engages said nose 132ª sufficiently to move the bar 131 forwardly a slight distance clearing the notch 134ª. Thus at the end of the forward stroke of the handle, the hammer 123ª is released to print, and in the event that the non-add key, the non-print key, the clear key or the total key has been depressed to elevate the type bar 5ª, the proper symbol will be printed. Normally the type bar 5ª occupies a position such that the operation of the hammer 123ª is ineffective.

Key locking and releasing mechanism.

I preferably provide some means for holding the error key, non-print key, the total key and the clear key depressed after their operation so as to avoid the necessity for the operator holding such keys downwardly during the operation of the machine. This means comprises a plurality of latch members 232, 233, 234 and 235 (Figs. 1 and 3) respectively adapted to engage with lugs 236 formed on the stems of the total key, the clear key, the non-print key and the error key. Said latch members 232, 233 and 234 are mounted upon a longitudinally extending bar 237 pivotally mounted at its opposite ends, and the latch member 235 is pivoted at 238. 239 is a link connecting the latch member 235 with the latch member 233, and 240 is a spring acting upon the lower end of the latch member 232 to force it and the other latch members normally into position to be engaged by the lugs 236. The arrangement is such that when any of said keys are depressed the lug 236 will engage with the corresponding latch member and be held thereby in its depressed position.

I have provided means for releasing said keys from their latch members upon the return of the carriage to its initial position. This means comprises a lug 241 (Fig. 1) mounted on the carriage and adapted to engage with an adjustable stop screw 242 carried by the upper end of an arm 243 which is rigid with the latch member 234. Since all of the latch members are connected together for movement in unison, it will be apparent that the engagement of the lug 241 with the screw 242 in the return movement of the carriage will serve to release all of said keys held downwardly by the latch members.

The release of three or fewer of said keys may also be effected by the depression of the fourth key. This is accomplished by shaping the lugs 236 to form cam surfaces 236ª adapted to engage with their respective latch members to effect the necessary swinging movement of all the latch members and release the keys held downwardly thereby.

The means for supporting the usual roll of paper (not shown), guiding the sheet into printing position and movably supporting a ribbon in front of the types to be driven to print, may be of any suitable construction. Herein I have shown by way of illustration, a platen 244 provided with the usual means for rotating the same and with a ratchet mechanism 245 of suitable construction. 246 designates generally the ribbon spools, and 247 the means for controlling the direction of movement of the ribbon.

*Operation.*

To illustrate the operation of the machine, let it be assumed that the operator desires to list and add the items "3" and "4", and that all of the stop wheels 155 are in their initial position shown in Fig. 2, in which the stop shoulder *a* (Fig. 17) is in position to be engaged by the finger 178 of the corresponding total stop lever. The operator depresses the digit key for the numeral "3", thus setting one of the stops 14. In this operation the lever 47, which is the sixth lever, counting from the rear (Figs. 2 and 10), is permitted to move upwardly under the force of its spring 52 and hence to permit the corresponding "3" stop finger 53 to be elevated. Simultaneously the bail rod 68 (Figs. 2 and 10) is engaged by the key lever, and the arm 66 swung upwardly to move the upstanding finger 65 rearwardly into engagement with the depending pin 64 upon the pivoted escapement dog 58, such movement of the dog taking place against the action of the spring 61. This operation of the dog 58 releases the carriage for movement to the left under the force of the spring 37 a distance of one tooth or just enough to permit the first one of the stops 14 to the left (Fig. 4) to escape from the bar 22 and move rearwardly under the action of its spring 23 into engagement with the raised stop finger 53. The operator then pulls the operating handle 70, thereby advancing the units elevator 9 until the forward end of the latter strikes the stop 14, the remaining elevators being held against forward movement by the plate 57.

In such forward movement of the units elevator, the corresponding type bar 5 is raised to a position such as to place the type "3" in printing position. Such upward movement of the type bar causes the hook member 141 to move downwardly, and moves the bail 127 rearwardly to allow the hammers 123 to print when released from the bar 131. Such release is effected after the handle 70 has travelled to its extreme forward position and started upon its return stroke. In such rearward movement of the handle, the pin 139 on the link 130 engages with the pivoted plate 136 (Fig. 1) and moves the link 135, and hence the arm 132 forwardly to disengage the bar 131 from all of the hammers 123. The only hammer allowed to swing forwardly, however, is that which is to drive the type "3" of the units bar to print, this hammer being released by the hook member 141 whereas the remaining hammers are prevented from such forward movement by their hook members which have remained stationary. During the advance movement of the units elevator, the corresponding stop wheel 155 is rotated by the engagement of the pinion 179 with the rack 180, a distance of three stop shoulders so that such stop wheel now presents shoulder *b* (Fig. 2) to the finger 178. This places shoulder *c* of the stop shoulders 158 into position to be engaged by the total stop finger 157 of the units total stop 154.

After returning the handle 70, the operator depresses the digit key for the numeral "4" thus setting up the "4" stop finger and releasing the carriage for movement one step to the left which causes the units stop 14 to move rearwardly into engagement with such stop finger. The operation of the handle forwardly causes the units type bar to print the numeral "4" and the units stop wheel to rotate through a distance of four stop shoulders until the shoulder $d$ (Fig. 2) is presented to the finger 178, and the shoulder $e$ is presented to the finger 157 of the units total stop 154.

The operator now depresses the total key thereby raising all of the fingers 178 into contact with the stop wheels, the finger 178 on the units total stop lever 154 rising into contact with the shoulder $d$ of the units stop wheel, and the remaining fingers engage the shoulder $a$ of the remaining stop wheels. Holding the total key down, the operator swings the handle forward, thereby advancing the units elevator until the shoulder $e$ of said elevator strikes against the finger 157 of the units total stop. The units elevator is then in position for printing the total "7".

If it is desired to print an item of say "8" and add it to the other two items, the carrying mechanism operates to rotate the tens stop wheel through a distance of one stop shoulder while the units stop wheel is rotating through a distance of eight stop shoulders. In this operation the cam projection 222 (Fig. 16) of the units stop wheel engages with the depending tooth 221 of the tens elevator, flexing the toggle 209 so as to permit the spring 79 of the tens elevator to move the section $9^b$ thereof forwardly a sufficient distance to move the tens stop wheel a distance of one shoulder. The units stop wheel in thus rotating through the distance of eight stop shoulders comes to rest with the shoulder $g$ (which is the shoulder corresponding to "5") and is in position to be engaged by the finger 178. Consequently, when the total is taken, the fingers 157 of the tens and units total stops will engage the stop shoulders corresponding to "1" and "5", respectively, and a total of "15" will be printed. In the same manner the numbers accumulated by the tens stop wheel are carried to the hundreds stop wheel, and so on.

I claim as my invention:

1. In an adding machine, a plurality of type bars mounted for up and down movement, a hammer for each of said bars, a rock shaft, a plurality of type bar elevators operable in the movement of the rock shaft in one direction to raise said type bars, and means operable in the movement of the rock shaft in the opposite direction to release said hammers and drive the type to print, the last mentioned means comprising a member engaging the hammers, a pivoted member operatively connected with said hammer-engaging member, and a part movable with said elevators into engagement with said pivoted member and adapted to swing it in one direction only.

2. In a printing mechanism, a type bar having a plurality of types, a hammer, a spring for actuating said hammer, a member adapted to engage with the hammer to hold it against the action of said spring, and means for releasing the hammer comprising a pivoted member, a link connecting said pivoted member with the hammer-holding member, a pivotal support for the pivoted member, and a pin movable substantially horizontally into engagement with the pivoted member whereby to move said support upwardly, said pin being adapted in its movement in the opposite direction to engage with the pivoted member whereby to move the hammer-holding member and release the hammer.

3. A printing mechanism comprising a type bar having a plurality of types, a pivoted hammer, a spring normally tending to move said hammer in a direction to cause the type to print, a latch member adapted to engage with the hammer to hold it against movement by the spring, a hook member movable by the type bar to permit of the swinging movement of the hammer, said hammer having a part adapted to engage with the hook member in the normal position of the latter, and means for actuating the latch member to release the hammer comprising a plate, a pivotal support upon which said plate is pivoted, means connecting the plate with the latch member, and a part having a cam engagement with the plate operable to move the support as the part moves in one direction and to move the plate as the part moves in the opposite direction.

4. A printing mechanism comprising a type bar having a plurality of types, a pivoted hammer, a spring normally tending to move said hammer in a direction to cause the type to print, a latch member adapted to engage with the hammer to hold it against movement by the spring, a hook member movable in the movement of the type bar to permit of the swinging movement of the hammer, said hammer having a part adapted to engage with the hook member in the normal position of the latter, and means for actuating the latch member to release the hammer comprising a plate, a pivotal support upon which said plate is pivoted, a part having a cam engagement with the plate operable to move the plate and support as the part moves in one direction and to move the plate as the part moves in the opposite direction, and key-controlled means for moving the plate out of the path of movement of said part.

5. In an adding machine, a plurality of type bars, a series of elevators for the type bars, a pair of horizontally slidable plates, a rock shaft operatively connected with said plates to move them, and springs connecting said elevators with one of said plates, the connections between the rock shaft and said plates being adapted upon initial movement of said shaft to release said plate for relative movement and to impart an accelerated movement to the lower one of said plates as the latter approach their initial position.

6. In an adding machine, an elevator having a main section and an auxiliary section, means normally maintaining said sections in separated relation, a pair of plates, a spring connecting one of said plates with one of said sections, and means for reciprocating said plates operable to permit immediate relative movement between said sections by the action of said spring upon rendering of the first said means inoperative and adapted to impart movement of acceleration to the auxiliary section as the elevator approaches its initial position.

7. In an adding machine, an elevator having a main section and an auxiliary section, a pair of plates engaging respectively with said sections, means including a spring for moving said sections together, and means for reciprocating said plates adapted to restore said sections to a normal separated relation, the means for reciprocating said plates comprising a pair of bifurcated pivoted arms, a cam member having a roller adapted to engage in the bifurcations of each of said arms, and a stud carried by one of said arms adapted to be engaged by the cam member upon the disengagement of the roller from said arm.

8. In an adding machine, an elevator having a main section and an auxiliary section, a pair of plates engaging respectively with said sections, means including a spring for moving said sections together, and means for reciprocating said plates adapted to restore said sections to a normal separated relation, the means for reciprocating said plates comprising a pair of bifurcated pivoted arms, and cam means adapted to engage in the bifurcations of each of said arms and to move one of said arms relative to the other as they approach their initial position.

9. In an adding machine, an elevator having a main section and an auxiliary section, a pair of plates engaging respectively with said sections, means including a spring for moving said sections together, and means for reciprocating said plates adapted to restore said sections to a normal separated relation, the means for reciprocating said plates comprising a pair of bifurcated pivoted arms, and cam means adapted to engage in the bifurcations of each of said arms and to move one of said arms relative to the other as they approach their initial position, said arms being connected together so as to permit of such relative movement therebetween.

10. A printing mechanism for adding machines comprising, in combination, a type bar, a hammer for driving a selected type to print, a spring for actuating said hammer, a latch normally holding said hammer against actuation by its spring, said latch being releasable upon movement of said type bar to printing position, secondary control means for preventing actuation of said hammer, an operating shaft, mechanism adapted to move said type bar to a selected position as said shaft moves in one direction, means operable to release said secondary means upon movement of said shaft in the reverse direction, and key-controlled means adapted to disable said release means.

In testimony whereof, I have hereunto affixed my signature.

GUSTAF DAVID SUNDSTRAND.